April 8, 1969 G. C. HILFINGER 3,437,392
THREE-DIMENSIONAL STRUCTURE HAVING ADJACENT WALLS JOINED TOGETHER
Filed April 7, 1967 Sheet 3 of 3
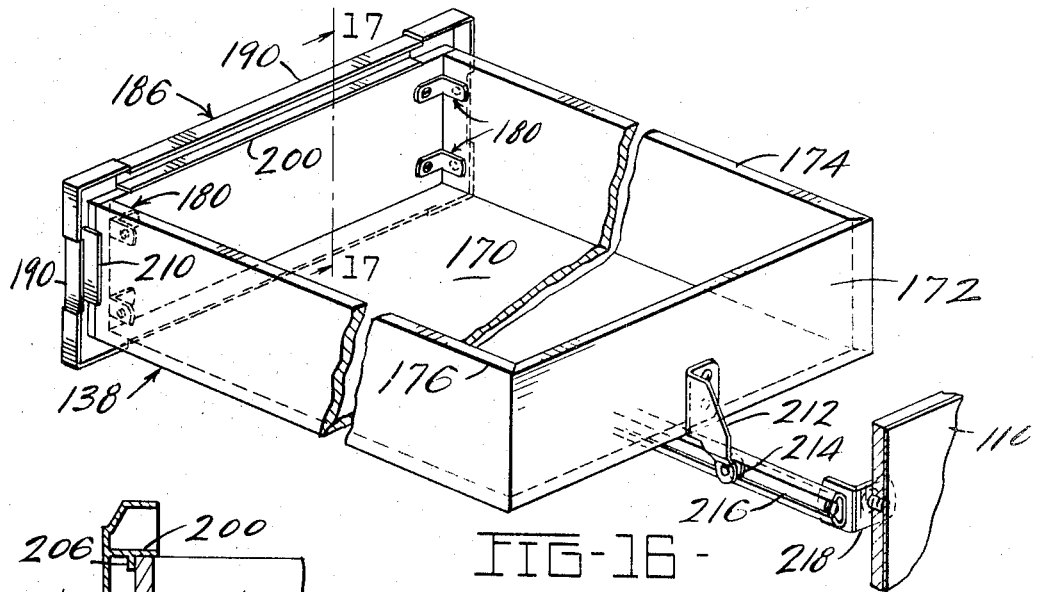
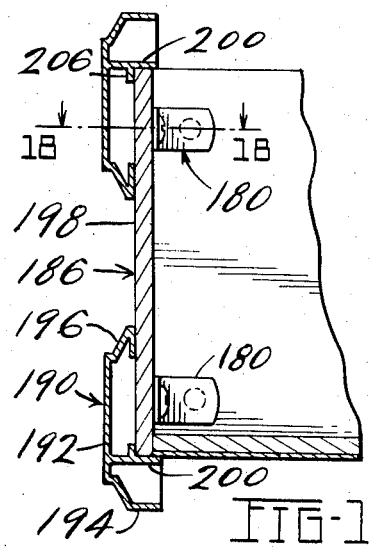
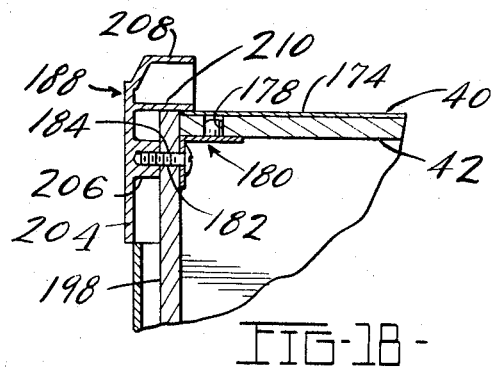
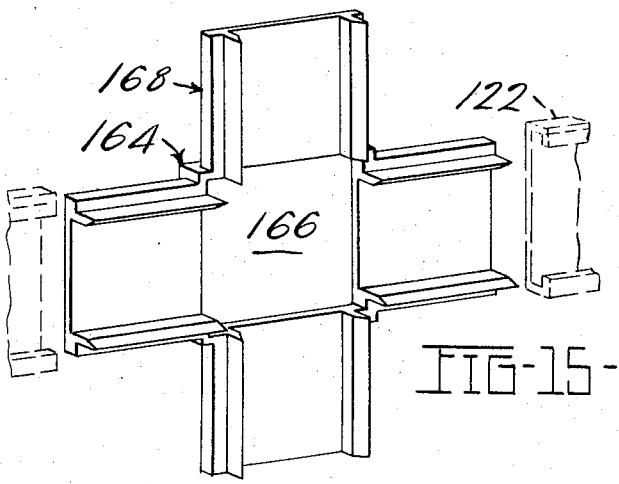
INVENTOR:
GEORGE C. HILFINGER.
BY
Owen & Owen
ATT'YS.

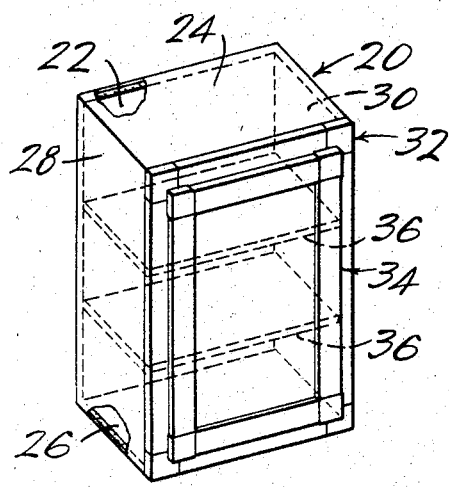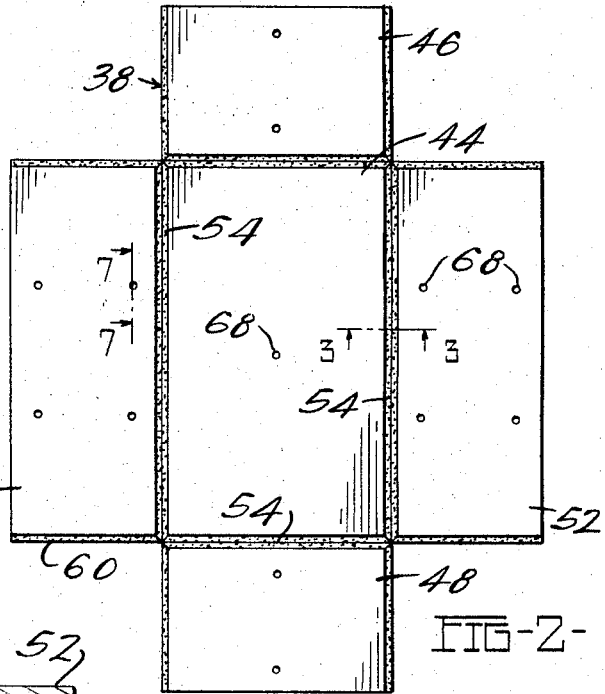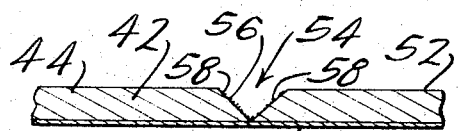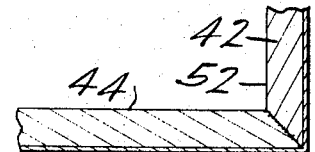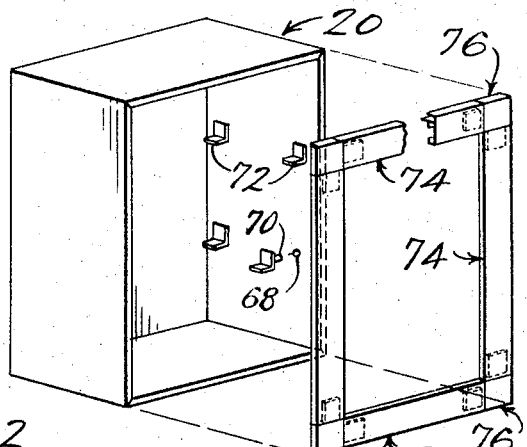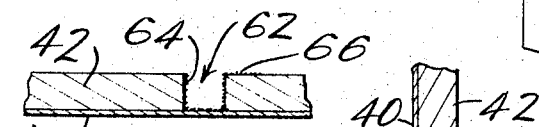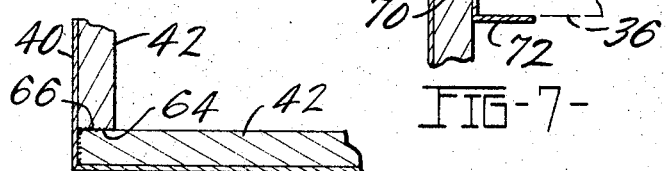
INVENTOR:
GEORGE C. HILFINGER
BY
ATT'YS.

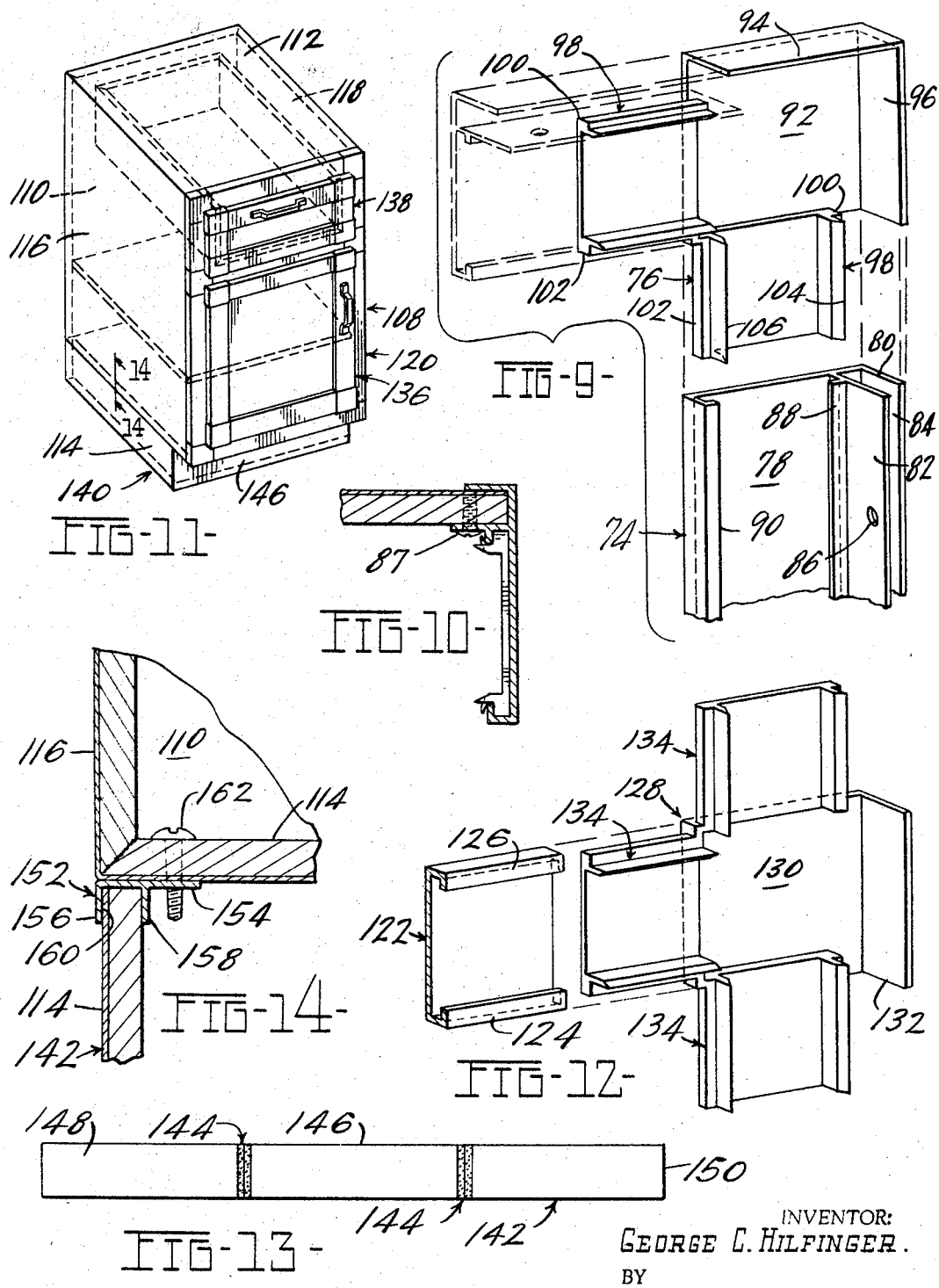

United States Patent Office 3,437,392
Patented Apr. 8, 1969

3,437,392
THREE-DIMENSIONAL STRUCTURE HAVING
ADJACENT WALLS JOINED TOGETHER
George C. Hilfinger, Toledo, Ohio, assignor to Wesley
Industries, Inc., Toledo, Ohio, a corporation of Ohio
Filed Apr. 7, 1967, Ser. No. 629,239
Int. Cl. A47b *43/02, 47/02*
U.S. Cl. 312—258                                    7 Claims

ABSTRACT OF THE DISCLOSURE

A knock-down construction for structures such as cabinets, drawers, and vanities includes a single two-layer sheet having a thin, outer metal layer and a thick, inner backing layer of hardboard or plywood. The sheet is formed to a predetermined shape and the inner layer is then grooved at joint lines and bent to form adjacent walls of the structure. A metal front frame is then affixed to the front edges of the walls for additional strength.

---

This invention relates to a construction for producing a knocked-down, three-dimensional structure having adjacent walls at angles to one another, and more particularly to a construction for cabinets, drawers and vanities.

In accordance with the invention, a unique construction is provided for making three-dimensional structures having walls meeting at angles with one another and defining at least a partially enclosed space. More specifically, the construction is intended for various types of cabinets, such as kitchen and utility cabinets, drawers, and vanities. Accordingly, at least two falls of the srtucture are made of a single sheet of material of predetermined shape, the sheet having a thin, outer layer of a bendable material and preferably metal such as aluminum, steel, or stainless steel. The sheet further comprises an inner, backing layer of a thicker, stiff material, with hardboard and plywood being suitable. The exposed surface of this layer preferably has a suitable decorative finish thereon. For some uses, such as institutional applications, this surface of the backing layer can be metal-clad to provide a durable, sanitary inner surface for the structure. The exposed surface of the thin, outer layer also preferably has a suitable finish and can have a wood grain coating or a decorative vinyl sheet affixed thereto, for example. The thickness of the thin layer can range from about 0.008 inch to about 0.040 inch depending on such factors as the structure to be made, the thickness of the backing layer, and the type of metal constituting the thin layer. The backing layer can range from about 1/8 inch in thickness to 1 inch or more in thickness, primarily depending upon the size and type of structure being made and the use for which it is intended.

The sheet can be cut first to a predetermined size and shape, depending upon the structure into which it is to be made. For example, where a cabinet shell is to be produced having a back, two sidewalls, a top wall, and a bottom wall, the sheet is cut to a cross-shaped pattern with the center of the pattern forming the back wall of the cabinet, the top and bottom legs of the cross being the top and bottom walls, and the horizontal legs of the cross being the sidewalls.

Grooves are machined in the backing or inner layer of the sheet before or after it is shaped, the grooves extending substantially through the inner layer but not through the thin, outer layer. These grooves are formed along the intended fold lines of the sheet. In the specific instance, there are four such grooves produced in the cross-shaped sheet, between adjacent inner corners thereof.

In making the cabinet shell, adhesive is first placed in the grooves and the four legs of the cross are bent upwardly with the backing layers moved toward one another, until the four legs are in planes perpendicular to the plane of the back. At this point, the edge portions of the backing layer adjacent the grooves are in abutting relaton with the adhesive affixing the edge portions permanently together, when dried or cured. The side, parallel edges of the legs of the cross can be beveled so that they also meet in abutting relation when bent to the position perpendicular to the back. The beveled edges also can be coated with adhesive which affixes these edges to one another to complete the cabinet shell.

The junctions of the sidewalls, top wall, and bottom wall with the back differ from the junctions of the adjacent walls in that the first junctions have thin, outer layer extending continuously around the joined edge portions of the grooves, whereas the latter junctions have the thin, metal layers meeting in abutting, but not continuous, relationship. With the continuous metal layer around the back joint, the ultimate strengh and rigidity for the cabinet is provided exactly where it is needed the most.

With the cabinet shell completed in this manner, a front frame is assembled therewith. The front frame preferably is made of four extruded side frame members having grooves which are received over the front edges of the sidewalls, top wall, and bottom wall and can be affixed thereto by small fasteners. The side frame members are rigidly joined at the corners as by die-cast corner members having tongues which are received by flanges extending rearwardly from the side frame members. The side frame members and corner members are first assembled, after which the grooves of the side frame members are placed over the edges of the cabinet walls and affixed thereto.

A door can be assembled with the front frame, preferably prior to attachment to the cabinet shell, as by attaching door hinges to pre-drilled holes in the front frame. For cabinets, the doors can be similar to those shown in a co-pending application, Ser. No. 609,972, of George C. Hilfinger and Xa D. Johnson.

The construction according to the invention can also be employed to produce a drawer, in which instance, a single sheet similar to that used for the cabinets, is shaped and grooved to form a bottom, sides, and an end wall of the drawer. A drawer front with flanges received over the edges of the sidewalls and bottom can then be assembled to complete the drawer.

A base cabinet as used in kitchens can be made similarly to the wall cabinet although the base cabinet may not have a top wall since a countertop is usually placed over a row of such cabinets.

In addition, a vanity can be made according to this construction although the vanity may have only a bottom wall and two side walls extending upwardly therefrom. The vanity would not have a top if a wash bowl and counter were placed thereon nor would it have a rear wall, in order to accommodate water and drain lines. Both the base cabinet and the vanity would have a front frame similar to that of the first-desribed cabinet.

A toe strip can also be made of similar construction and employed with the vanity or base cabinet, being affixed to the sidewalls thereof by suitable extrusions to be discussed subsequently, or by other suitable fasteners.

Other features of the invention include brackets for supporting shelves within the cabinet enclosure with holes partially drilled in the walls thereof for receiving the fasteners and positioned, in some instances, such that the cabinet can be used either in a vertical or horizontal position. The front frame also includes special connectors for additional cross frame members when a cabinet has a drawer above and a door below, or more than one door, for example.

The construction according to the invention enables the labor costs in the manufacture of cabinets to be reduced to a minimum since there are none of the usual cross braces, special framing, etc., along with numerous machining joining, or woodworking operations, which are ordinarily required. For shipping, the construction also is extremely advantageous since the sheets can be shipped flat to consume a minimum amount of space. The door frames and doors can be pre-assembled, if desired, and also shipped flat. Further, the sheet materials of which the structures are made also are durable, easily cleaned, rigid, and can be substantially warp-proof.

In summary, the invention comprises a container structure and specifically a cabinet structure having walls which are connected together and have a front frame which cooperates with each of the walls in close-fitting relationship to supply additional rigidity to the structure. The frame preferably includes extruded side frame members connected at fixed, predetermined angles by die-cast corner members, the frame members having grooves receiving the front edges of the walls.

It is, therefore, a principal object of the invention to provide improved construction for three dimensional structures of the type described above and having the advantages outlined herein.

Numerous other objects and advantages of the invention will be apparent from the following detailed description of preferred embodiments thereof, reference being made to the accompanying drawings, in which:

FIG. 1 is a view in perspective of a kitchen wall cabinet embodying the invention;

FIG. 2 is a plan view of a two-layer sheet for making the shell of the cabinet of FIG. 1 in accordance with the invention;

FIG. 3 is a sectional view taken along the line 3—3 of FIG. 2 and showing a groove formed in the backing layer of the sheet;

FIG. 4 is a view similar to FIG. 3 but showing the portions of the sheet on each side of the groove bent into assembled relation to form a corner or joint between adjacent walls of the structure;

FIG. 5 is a view similar to FIG. 3 of a modified groove in a backing layer of the sheet;

FIG. 6 is a view similar to FIG. 4, showing the backing layer on each side of the groove when assembled;

FIG. 7 is a view in vertical cross section taken along the line 7—7 of FIG. 2 and further showing a shelf bracket in position;

FIG. 8 is a view in perspective of the cabinet shell with a front frame about to be assembled therewith;

FIG. 9 is a greatly enlarged view in rear perspective showing certain components of the front frame of FIG. 8;

FIG. 10 is a view in cross section through a portion of the cabinet shell with the front frame assembled therewith;

FIG. 11 is a view in perspective of a base cabinet made in accordance with the invention;

FIG. 12 is an enlarged view in rear perspective of certain components of a front frame of the base cabinet of FIG. 11;

FIG. 13 is a plan view of a sheet embodying the invention for making a toe strip of the base cabinet of FIG. 11;

FIG. 14 is an enlarged fragmentary view in perspective taken along the line 14—14 of FIG. 11 and showing the manner in which the base cabinet and toe strip are connected;

FIG. 15 is a rear view in perspective of part of a modified front frame;

FIG. 16 is a rear view in perspective of a drawer constructed in accordance with the invention;

FIG. 17 is an enlarged view in cross section taken along the line 17—17 of FIG. 16; and FIG. 18 is a fragmentary view in cross section taken along the line 18—18 of FIG. 17.

Referring to FIG. 1, a cabinet such as a kitchen wall cabinet is indicated at 20 and is constructed in accordance with the invention. The cabinet 20 includes a back 22, a top wall 24, a bottom wall 26, and sidewalls 28 and 30. The cabinet further includes a front frame 32 and a door 34, along with shelves 36.

The cabinet shell is constructed from a single sheet 38 shown in FIG. 2. This sheet constitutes a thin, outer layer over 40 (FIG. 3) of a bendable material, and a thick, inner, backing layer 42 of a stiffer material, as discussed previously. The sheet 38 is formed to a predetermined shape, a cross shape in this instance, to make a wall cabinet. The sheet has a center panel 44 from which the back 22 of the cabinet 20 is made and also has upper and lower leg panels 46 and 48 from which the top wall 24 and the bottom wall 26 are made. Finally, the sheet 38 has side leg panels 50 and 52 from which the sidewalls 28 and 30 are made.

After the sheet 38 is cut to the predetermined shape, grooves 54 are machined therein at the junctions of the back panel 44 with the other panels 46–52. As best shown in FIG. 3, the grooves 54 are cut to the depth of the backing layer 42 but do not extend into or through the thin outer layer 40. An adhesive 56 is then placed on edge portions 58 adjacent the grooves 54; the panels of the sheet 38, in this instance, the panels 44 and 52, are bent toward one another until at right angles, with the edge portions 58 and the adhesive being in contact with one another, as shown in FIG. 4. The thin, outer layer 40 bends around the resulting joint in this instance to provide a smooth, unbroken outer surface for the cabinet 20. With this type of construction, and by using a strong epoxy adhesive, an extremely strong joint results.

The parallel side edges of the leg panels 46–52 are beveled, as shown at 60, and the adhesive 56 is also placed on the beveled edges before the sheet 38 is folded. With this arrangement, when the sheet is folded with the leg panels 46–52 perpendicular to the back panel 44, the beveled edges 60 and adhesive thereon come into contact to provide joints between the respective walls 24–30 of the cabinet. These joints are similar to the joint shown in FIG. 4 except that the thin, outer layer 40 is not continuous around the joint, but meets in abutting relation thereat.

The joints and the grooves need not be identical to those shown in FIGS. 3 and 4. In the event that the walls are not to be joined at right angles but may be at a different angle, as for some corner cabinets, for example, the groove will not be cut with the sides at 45° angles to a plane perpendicular to the sheet and extending longitudinally of the groove, but may be at greater or lesser angles. With a groove 62 shown in FIGS. 5 and 6, sides of the groove 62 are parallel to a plane perpendicular to the panel and extending longitudinally of the groove. In this instance, the bottom of the groove has a width substantially equal to the thickness of the backing layer 42. Consequently, when the adjacent panels of the layer 40 and 42 are bent toward one another, an edge portion or side 64 of the one panel abuts an upper edge portion 66 of the other panel, as shown in FIG. 6. With both of the joints shown in FIGS. 4 and 6, edge portions of the backing layer 42 are moved into abutting relationship when the panels adjacent the groove are bent toward one another.

About the time the grooves 54 are machined in the sheet 38, additional holes 68 (FIGS. 2 and 7) are made therein. The holes 68 are formed only through the backing layer 42 and not the thin layer 40. These holes are of sufficient depth to receive projections 70 of shelf brackets 72 of a type known in the art. The holes 68 are drilled in positions to receive two of the shelves 36, as shown in FIG. 1. In addition, however, the holes are also drilled in the upper and lower panels 46 and 48 and in the center of the back panel 44. With this arrangement, the cabinet 20 can be placed on its side relative to the position of FIG. 1 with the openings in the panels 46, 48, and 44 then being capable of receiving brackets to support a central shelf. Hence, the cabinet shell can be used in either the vertical position, as shown, or a horizontal position so as to serve a double roll insofar as dimensions are concerned. This enables a reduction in inventory of the number of sizes of cabinets which need to be stocked.

When the sheet 38 is bent, it assumes the appearance as shown in FIG. 8 and thereby constitutes a cabinet shell. At this time, the front frame 32 is assembled therewith. The frame 32 provides a support for the door 34 and adds substantial strength to the overall cabinet 20 as well as provides a finished appearance therefor. As shown in FIG. 9, the frame 32 includes extruded frame members 74 which constitute the sides as well as the top and bottom of the frame 32. The frame members 74 are rigidly connected by die-cast corner members 76. Each of the extruded frame members 74 includes a main web 78 with an outer flange 80 fitting over the edge of one of the panels 46–52 and a slightly wider inner flange 82 fitting over the inner surface of the edge of the panel with the edge received in a groove 84. As also shown in FIG. 10, the flange 82 has openings 86 spaced therealong to receive fasteners 87 to firmly hold the front frame 32 with respect to the cabinet shell. The frame member 74 also has L-shaped flanges 88 and 90 forming a groove with the web 78 to receive the corner member 76.

The corner frame member 76 has a main web 92 with outer flanges 94 and 96 of the same width as the outer flange 80 of the frame member 74 and co-extensive therewith. The corner frame member 76 has two tongues 98 extending therefrom at mutually perpendicular angles to receive the frame members 74. The tongues 98 have edge ridges 100 and 102 extending transversely to be received by the flanges 88 and 90. Rear flanges 104 and 106 of the tongues 98 extend beyond the flanges 88 and 90, as shown in FIG. 10, and can be peened over or staked to provide a secure mechanical connection between the corner members and the side frame members.

In a preferred form, the front frames 32 are pre-assembled and the doors 34 then assembled therewith by attaching the door hinges to openings in the front frame. The frame and door assembly can be shipped flat with the sheet 38 and assembled therewith at the destination or point of use after the shell is formed from the sheet.

A base cabinet 108 constructed according to the invention is shown in FIG. 11. The cabinet 108 includes a back wall 110, a top wall 112 (although this wall would be eliminated in many instances where a plurality of the base cabinets are employed in a row with a single countertop extending thereacross), a bottom wall 114, and sidewalls 116 and 118. The cabinet 108 is formed from a sheet similar to that shown in FIG. 2 but with dimensions correspondingly altered and with the upper leg panel eliminated in the event the top wall 112 is not used. The grooves in the sheet can be similar to those of FIG. 3 or FIG. 5, for example.

When the cabinet shell is formed, a front frame 120 is assembled therewith in a manner similar to that for the cabinet 20. The front frame 120 differs from the frame 32 primarily in that a cross bar 122 (FIG. 12) is employed at an intermediate part of the frame. The cross bar 122 has side L-shaped flanges 124 and 126 corresponding to the flanges 88 and 90 of the side frame member 74. The cross bar member 122 is assembled with a T-shaped frame member 128 having a main web 130 and an outer flange 132 co-extensive with the flanges 80 of the side frame member 74. Three tongues 134 extend from the web 130 with the tongues being substantially identical in configuration to the tongues 98 of the corner frame member 76. The upper and lower tongues 134 are received by the flanges 88 and 90 of the side frame members 74 while the horizontal tongue 134 is received by the flanges 124 and 126 of the cross bar member 122.

A door 136 can be affixed to the frame 120 in the same manner as the door 34. In addition, a drawer indicated at 138 is located in an upper portion of the cabinet 108 above the cross bar 122.

Also in accordance with the invention, the base cabinet 108 has a toe strip 140 at the bottom thereof. This toe strip is made from a single sheet 142 of the two-layer material, as shown in FIG. 13. The sheet 142 has two grooves 144 formed therein and extending between opposite edges of the sheet 142. The grooves can be formed as shown in FIG. 3 or FIG. 5 and the strip bent to a U-shaped configuration, with an intermediate panel 146 forming the front of the toe strip and with outer panels 148 and 150 forming the sides thereof.

The toe strip 140 can be affixed to the bottom wall 114 through a connecting extrusion 152 as shown in FIG. 14. The extrusion 152 includes a main, horizontal wall 154 from which flanges 156 and 158 depend with these flanges forming a groove 160 received on the upper edge of the strip 140. Suitable sheet metal screws or other fasteners 162 can then be employed to affix the wall 154 to the bottom wall 114 of the cabinet. In some instances, the toe strip 140 may be made of thicker material with the inner layer being of ¾ inch plywood. In that case, the fasteners can be driven directly into the toe strip without the necessity of employing the connecting extrusions 152.

Particularly with some larger base cabinets, a pair of doors may be employed with two drawers thereabove. In such an instance, the front frame can include a cross-shaped center frame made up of two horizontal cross bar members similar to the member 122 and two vertical cross bar members of the same design. In this instance, these members are connected by a cross-shaped die-cast frame member 164 (FIG. 15) having a central web 166 from which four tongues 168 extend, these tongues being substantially the same as the tongues 134 of the T-shaped frame member 128.

Referring to FIGS. 16–18, a drawer shell of the drawer 138 can be made according to the invention, the shell comprising a bottom wall 170, a rear end wall 172, and sidewalls 174 and 176. These are made from a single sheet of two-layer material with the bottom wall 170 being a central panel and with three panels extending therefrom to comprise the rear end wall 172 and the sidewalls 174 and 176, the panels being separated by grooves similar to the grooves 54, for example.

As shown in FIG. 18, forward end portions of the sidewalls 174 and 176 have holes 178 extending through the inner layer 42 to the thin outer layer 40 to receive connecting brackets 180. The brackets 180 are similar to the shelf brackets 72 except for having openings 182 to receive fasteners 184 for affixing the sidewalls 174 and 176 to a drawer front 186. The drawer front 186 includes die-cast corner frame members 188 connected to upper, lower, and end extruded frame members 190 by a tongue and groove arrangement quite similar to that employed for the front frames of FIGS. 9 and 12.

As shown in FIG. 17, the extruded frame members 190 include main webs 192 with outer flanges 194 and inner flanges 196 which abut a suitable central panel 198. This panel extends between intermediate flanges 200 with these flanges having small branch flanges 202 which contact and support outer portions of the panel 198. The intermediate flanges 200 extend rearwardly beyond the panel 198 and engage the lower front edge portion of the drawer bottom 170 as well as the outer front edge portions of the sidewalls 174 and 176.

The corner frame members 188 have webs 204 with bosses 206 extending rearwardly therefrom to receive the fasteners 184. The fasteners 184 thereby serve a double purpose of attaching the drawer front 186 to the sidewalls 174 and 176 by means of the brackets 180 and also affix the front panel 198 to the frame through the corner bosses 206. The corner frame members 188 also have outer flanges 208 which can lie outwardly slightly from the flanges 194 of the extruded members for decorative purposes, if desired. Further, the corner members can have intermediate flanges or tabs 210, if desired, to provide additional support for the sidewalls.

The drawer can be supported and guided by any suitable means. In the specific instance shown, this is accomplished by a bracket 212 affixed to the rear end wall 172 and having a roller 214 extending therebelow. The roller 214 is received in a generally C-shaped track 216 which is affixed to the back wall 110 of the cabinet 108 by a bracket 218 and can be affixed to a central part of the cross bar 122 by suitable clips (not shown) pressed between the flanges 124 and 126. Rollers (not shown) can be supported by the cross bar 122 adjacent the bottom of the drawer to support the bottom as the drawer is pulled in and out.

Various modifications of the above described embodiments of the invention will be apparent to those skilled in the art, and it is to be understood that such modifications can be made without departing from the scope of the invention, if they are within the spirit and the tenor of the accompanying claims.

I claim:

1. A cabinet structure comprising two side walls and at least one additional wall extending between said side walls and joined therewith, said walls having front edges terminating in a substantially common plane and forming a front opening, a front metal frame having at least three frame members with rearwardly-facing grooves fitting over front edges of said walls and engaging opposite surfaces of each of said walls adjacent said front edges, means rigidly connecting said frame members at predetermined angles with respect to one another to stiffen said walls and to aid in holding them at predetermined angles relative to one another to add structural rigidity to said cabinet structure, said connecting means being separable from said frame members.

2. A cabinet structure according to claim 1 characterized by each of said frame members being extruded and further having flanges cooperating to receive a tongue, and said connecting means each comprising a die-cast member having two mutually-perpendicular tongues extending therefrom, said tongues being sized and shaped to be received between said flanges of said frame members.

3. A cabinet structure according to claim 1 further characterized by fastener means extending through holes in said frame members and transversely into said walls to affix said frame members to the front edges of said walls.

4. A cabinet structure having at least two side walls and a horizontal wall extending therebetween, said walls being formed of a single sheet of material, said sheet comprising an outer layer of thin, bendable metal and a backing layer of stiff, thicker material affixed to said outer layer, said sheet, when flat, having a groove extending between edges thereof with said backing layer forming sides of said groove, said backing layer having adjacent edge portions in contact with one another with adhesive therebetween, said outer layer forming a continuous surface around said edge portions, said walls having front edges terminating in a common plane forming a front opening, a metal front frame having frame members with grooves fitting over said front edges of said walls and engaging opposite surfaces of each of said walls adjacent said front edges, means rigidly connecting said frame members at predetermined angles with respect to one another to stiffen said walls and hold them at predetermined angles relative to one another to add structural rigidity to said cabinet.

5. A cabinet structure having two side walls, a top wall, and a bottom wall, said walls having front edges lying in a common plane and forming a front opening, a metal front frame having at least two vertical frame members, a top frame member and a bottom frame member, each of said frame members having an outer flange extending rearwardly adjacent an outer edge of the frame member and an inner flange spaced therefrom and forming a groove with the outer flange, said flanges fitting over the front edges of said walls and lying in contiguous relationship with the outer and inner surfaces of said walls, and means rigidly connecting said frame members at perpendicular angles with respect to one another to aid in holding said walls in fixed relationship with respect to one another.

6. A cabinet structure according to claim 5 characterized by each of said frame members having additional flanges cooperating with one another to receive a tongue, and said connecting means having tongues received by said additional flanges of said frame members.

7. A cabinet structure according to claim 5 characterized by each of said side frame members being in at least two pieces with T-shaped members having tongues joining each two-piece side frame member and having tongues facing one another, and a cross bar extending between the facing tongues and connected thereto to separate the front opening into two portions, one above and one below said cross bar.

References Cited

UNITED STATES PATENTS

| 1,398,071 | 11/1921 | Forester | 248—239 X |
| 1,649,206 | 11/1927 | Yawman | 248—216 X |
| 1,851,518 | 3/1932 | McGovern | 229—44 |
| 2,274,765 | 3/1942 | Zalkind | 161—111 |
| 2,701,174 | 2/1955 | Franks | 312—330 X |
| 2,932,439 | 4/1960 | Sparling | 229—31 |
| 2,985,075 | 5/1961 | Knutsson-Hall | 229—51 |

FOREIGN PATENTS

| 711,992 | 6/1965 | Canada. |

JAMES T. McCALL, *Primary Examiner.*

U.S. Cl. X.R.

229—31; 312—257